US012380843B2

(12) United States Patent
Kim

(10) Patent No.: US 12,380,843 B2
(45) Date of Patent: Aug. 5, 2025

(54) DISPLAY APPARATUS

(71) Applicant: LG Display Co., Ltd., Seoul (KR)

(72) Inventor: Hyejin Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/524,854

(22) Filed: Nov. 30, 2023

(65) Prior Publication Data

US 2024/0221634 A1 Jul. 4, 2024

(30) Foreign Application Priority Data

Dec. 30, 2022 (KR) ........................ 10-2022-0190476

(51) Int. Cl.
*G09G 3/3208* (2016.01)

(52) U.S. Cl.
CPC ... *G09G 3/3208* (2013.01); *G09G 2320/0223* (2013.01); *G09G 2330/021* (2013.01)

(58) Field of Classification Search
CPC .. G09G 3/3208; G09G 3/20; G09G 2330/021; G09G 2320/0223
See application file for complete search history.

(56) References Cited

U.S. PATENT DOCUMENTS

| | | | | |
|---|---|---|---|---|
| 10,679,540 | B2 | 6/2020 | Park et al. | |
| 11,250,762 | B2 | 2/2022 | Nam et al. | |
| 2007/0024202 | A1* | 2/2007 | Lee | G09G 3/296 315/160 |
| 2015/0022174 | A1* | 1/2015 | Nikitin | H02M 3/157 323/282 |
| 2016/0180815 | A1* | 6/2016 | Pyo | G09G 3/2022 345/82 |
| 2016/0336857 | A1* | 11/2016 | Liu | H02M 3/1588 |
| 2019/0172379 | A1* | 6/2019 | Park | G09G 3/20 |
| 2020/0144916 | A1* | 5/2020 | Lee | H02M 1/36 |
| 2021/0211052 | A1* | 7/2021 | Zhao | H02M 1/0009 |
| 2021/0280121 | A1* | 9/2021 | Nam | G09G 3/3685 |
| 2022/0069712 | A1* | 3/2022 | Mondal | H02M 1/0009 |

FOREIGN PATENT DOCUMENTS

| | | |
|---|---|---|
| KR | 20190066104 A | 6/2019 |
| KR | 20210112442 A | 9/2021 |

* cited by examiner

*Primary Examiner* — Christopher E Leiby
(74) *Attorney, Agent, or Firm* — Seed IP Law Group LLP

(57) ABSTRACT

Provided is a display device. The display device includes a display panel configured to display an image; a driving unit including a data driver and a gate driver for driving the display panel; and a power supply unit configured to supply a power voltage for driving the driving unit using an input voltage; wherein the power supply unit controls the power voltage according to a load level of the driving unit.

7 Claims, 8 Drawing Sheets

DISPLAY APPARATUS

CROSS-REFERENCE TO RELATED APPLICATION

This application claims the benefit of and priority to Korean Patent Application No. 10-2022-0190476 filed on Dec. 30, 2022, in the Republic of Korea, the entire contents of which are hereby expressly incorporated by reference into the present application.

BACKGROUND

Technical Field

The present disclosure relates to a display device, and more particularly, to a display device capable of customizing a voltage according to a load.

Discussion of the Related Art

Recently, as our society advances toward an information-oriented society, the field of display devices for visually displaying an electrical information signal has rapidly advanced. The development of various display devices having excellent performance in terms of thinness, lightness, and low power consumption, is being conducted correspondingly.

Representative display devices may include a liquid crystal display device (LCD), a field emission display device (FED), an electro-wetting display device (EWD), an organic light emitting display device (OLED), and the like.

Among these display devices, an organic light emitting display device is a self-emission display device, and can be manufactured to be light and thin since it does not require a separate light source, unlike a liquid crystal display device having a separate light source. In addition, the organic light emitting display device has advantages in terms of power consumption due to a low voltage driving, and is excellent in terms of a color implementation, a response speed, a viewing angle, and a contrast ratio (CR). Therefore, organic light emitting display devices are expected to be utilized in various fields.

BRIEF SUMMARY

An aspect of the present disclosure is to provide a display device allowing for a reduction in power consumption by supplying an customized voltage to a driving unit.

Another aspect of the present disclosure is to provide a display device capable of preventing driving failure due to a voltage level in an overload band.

Objects of the present disclosure are not limited to the above-mentioned objects, and other objects, which are not mentioned above, can be clearly understood by those skilled in the art from the following descriptions.

According to an aspect of the present disclosure, there is provided a display device. The display device includes a display panel configured to display an image; a driving unit including a data driver and a gate driver for driving the display panel; and a power supply unit configured to supply a power voltage for driving the driving unit using an input voltage; wherein the power supply unit controls the power voltage according to a load level of the driving unit.

Other detailed matters of the exemplary embodiments are included in the detailed description and the drawings.

According to the present disclosure, there is provided a display device allowing for a reduction in power consumption since it can be driven with low power at a low load by supplying an optimized voltage to a driving unit through changing a power voltage output from a power supply unit according to a load size of a driving unit.

According to the present disclosure, there is provided a display device capable of preventing occurrence of driving failure due to a voltage level in an overload band by changing a power voltage output from a power supply unit according to a load size of a driving unit.

The effects according to the present disclosure are not limited to the contents exemplified above, and more various effects are included in the present specification.

DETAILED DESCRIPTION

Figure 1:
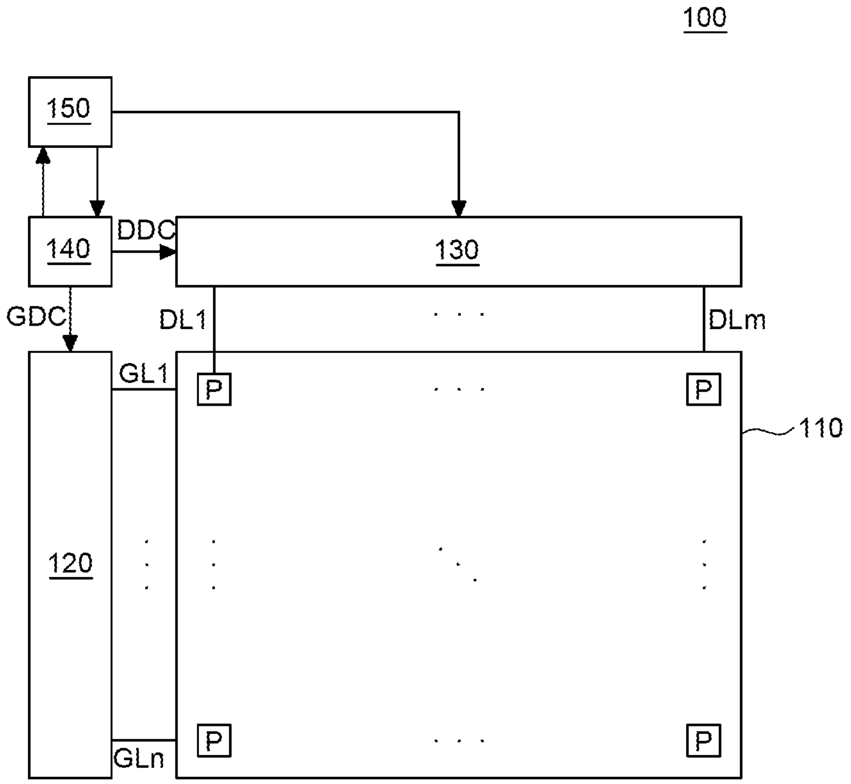
FIG. 1 is a schematic block diagram of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next,"

one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

Figure 2:
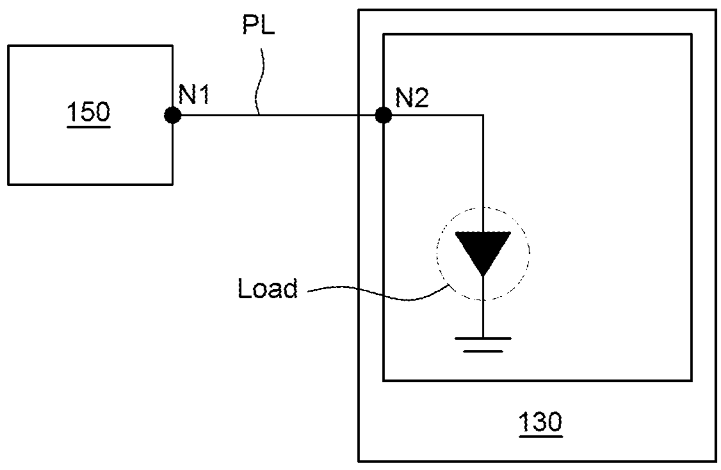
FIG. 2 is a block diagram illustrating a connection between a power supply unit and a data driver according to an exemplary embodiment of the present disclosure.

FIG. 1 is a schematic block diagram of a display device according to an exemplary embodiment of the present disclosure. FIG. 2 is a block diagram illustrating a connection between a power supply unit and a data driver according to an exemplary embodiment of the present disclosure.

Referring to FIG. 1, a display device 100 includes a display panel 110, a gate driver 120, a data driver 130, a timing controller 140, and a power supply unit 150.

The display panel 110 is a panel for displaying an image. The display panel 110 may include various circuits, lines, and light emitting elements that are disposed on a substrate. The display panel 110 is divided by a plurality of data lines DL and a plurality of gate lines GL that intersect with each other, and may include a plurality of pixels PX that are connected to the plurality of data lines DL and the plurality of gate lines GL. The display panel 110 may include a display area defined by the plurality of pixels PX and a non-display area in which various signal lines, pads and the like are formed. The display panel 110 may be implemented as a display panel 110 that is used in various display devices such as a liquid crystal display device, an organic light emitting display device, and an electrophoretic display device. Hereinafter, the display panel 110 will be described as a panel used in an organic light emitting display device, but is not limited thereto.

The gate driver 120 supplies gate signals to the plurality of pixels PX. The gate driver 120 may include a level shifter and a shift register. The level shifter may shift a level of a clock signal that is input as a transistor-transistor logic (TTL) level according to a gate timing control signal GDC input from the timing controller 140 and then, supply it to the shift register. The shift register may be formed in the non-display area of the display panel 110 by a GIP (Gate In Panel) method, but is not limited thereto. The shift register may be configured to include a plurality of stages for shifting and outputting the gate signals in response to the clock signal and a driving signal. The plurality of stages included in the shift register may sequentially output the gate signals through a plurality of output terminals.

The data driver 130 supplies data voltages to the plurality of pixels PX. The data driver 130 may include a plurality of source drive integrated circuits (IC). The plurality of source drive IC may be supplied with digital video data and a source timing control signal DDC from the timing controller 140. The plurality of source drive IC may convert the digital video data into gamma voltages in response to the source timing control signal DDC to generate data voltages and supply the data voltages through the data lines DL of the display panel 110. The plurality of source drive ICs may be connected to the data lines DL of the display panel 110 through a chip on glass (COG) process or a tape automated bonding (TAB) process. In addition, the source drive ICs may be formed on the display panel 110 or may be formed on a separate PCB board and connected to the display panel 110.

The timing controller 140 receives timing signals such as a vertical synchronization signal, a horizontal synchronization signal, a data enable signal, a dot clock signal and the like through a receiving circuit such as an LVDS or TMDS interface that is connected to a host system. The timing controller 140 generates timing control signals for controlling the data driver 130 and the gate driver 120 based on input timing signals.

The power supply unit 150 supplies a power voltage for driving the gate driver 120 and the data driver 130 using an input voltage. The power supply unit 150 may supply a gate high power voltage and a gate low power voltage for driving the gate driver 120. Also, the power supply unit 150 may supply a logic power voltage for driving a logic circuit of the data driver 130. Also, the power supply unit 150 may supply a power voltage to the display panel 110. However, hereinafter, it will be described that the power supply unit 150 supplies a power voltage to the data driver 130 as an example. Referring to FIG. 2, the power supply unit 150 and the data driver 130 are connected through a power line PL, so that a logic power voltage may be supplied to an input terminal N2 of the logic circuit of the data driver 130 through the power line PL from an output terminal N1 of the power supply unit 150.

Hereinafter, the power supply unit 150 will be described in detail with reference to FIGS. 3, 4, and 5.

Figure 3:
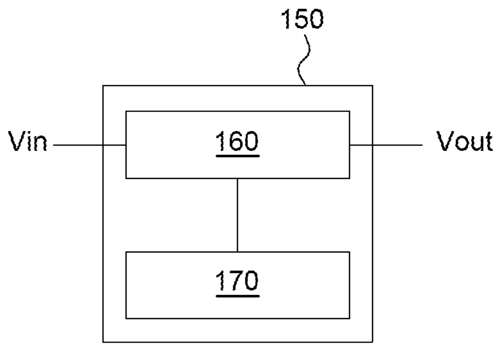
FIG. 3 is a block diagram illustrating the power supply unit according to an exemplary embodiment of the present disclosure.
Figure 6:
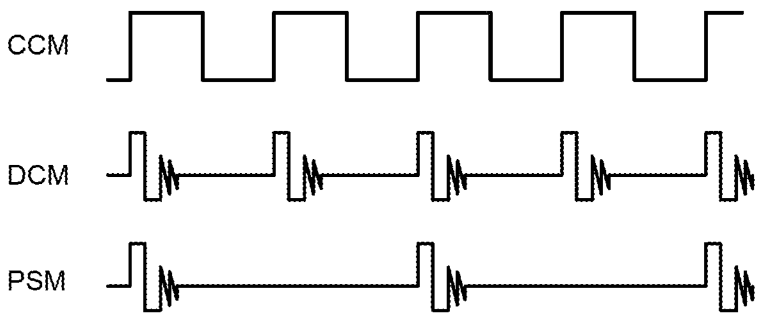
FIG. 6 is a waveform diagram illustrating waveforms input to a first switch of the power unit.
Figure 7:
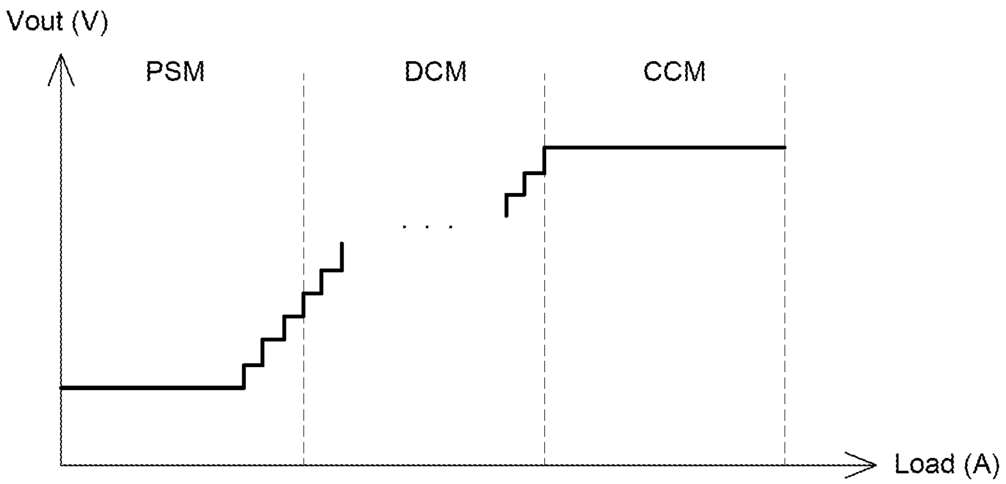
FIG. 7 is a graph illustrating outputs of the power unit in respective current modes of the power unit.
Figure 8:
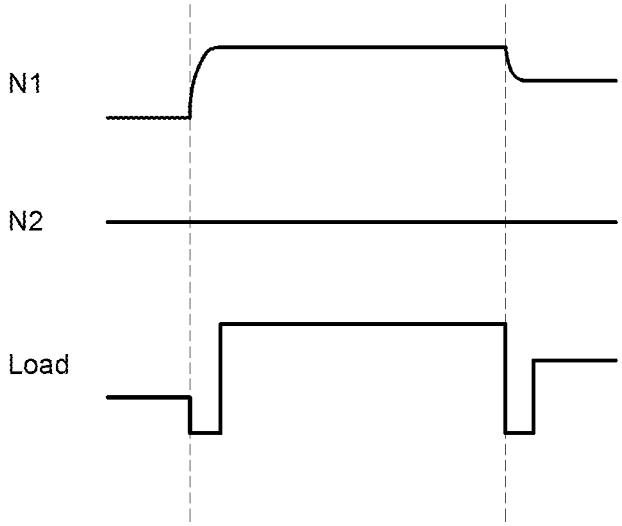
FIG. 8 is a waveform diagram illustrating voltages of respective nodes in FIG. 2 according to a load size.

FIG. 3 is a block diagram illustrating the power supply unit according to an exemplary embodiment of the present disclosure. FIG. 4 is a circuit diagram illustrating a power unit. FIG. 5 is a block diagram illustrating a power management unit. FIG. 6 is a waveform diagram illustrating waveforms input to a first switch of the power unit. FIG. 7 is a waveform diagram illustrating voltages of respective nodes in FIG. 2. FIG. 7 is a graph illustrating outputs of the power unit in respective current modes of the power unit. FIG. 8 is a waveform diagram illustrating voltages of respective nodes in FIG. 2 according to a load size.

Referring to FIG. 3, the power supply unit 150 includes a power unit 160 and a power management circuit 170.

The power unit 160 generates a power voltage Vout using an input voltage Vin supplied to an input unit thereof and outputs the power voltage Vout to the output terminal N1. The power unit 160 may be a DC-DC converter that converts a DC input voltage into a DC output voltage and outputs the converted voltage. Output power is a function of both the voltage value and the current value. In some embodiments, the value of the power output is varied by changing only the value of the output voltage, while in other embodiment, it is done by changing the amount of current that can be output, while in other embodiments, both the current and the voltage values might vary to change the output power.

Figure 4:
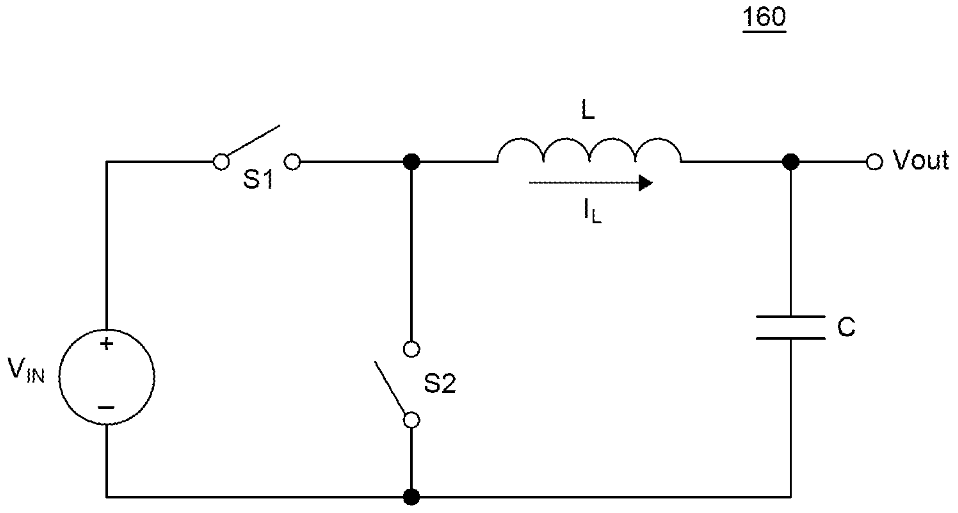
FIG. 4 is a circuit diagram illustrating a power unit.

Referring to FIG. 4, the power unit 160 includes a first switch S1, an inductor L, and a second switch S2. The first switch S1 is connected between an input terminal to which the input voltage Vin is input and the output terminal N1. The inductor L is connected between the first switch S1 and the output terminal N1. The second switch S2 is connected between the first switch S1 and the inductor L. Specifically, one end of the first switch S1 is connected to the input terminal to which the input voltage Vin is input, and the other end of the first switch S1 is connected to one end of the inductor L. The other end of the inductor L is connected to the output terminal N1. One end of the second switch S2 is connected between the other end of the first switch S1 and one end of the inductor L. A capacitor C for counter electromotive force charging may be connected to the output terminal N1. In this case, the first switch S1 and the second switch S2 may be transistors and operate according to pulse signals input to gate electrodes of the first switch S1 and the second switch S2. In this operation of the power unit 160, when the first switch S1 is turned on and the second switch S2 is turned off, power may be accumulated in the inductor L by the input voltage Vin. In addition, when the first switch S1 is turned off and the second switch S2 is turned on, the power accumulated in the inductor L may be output to the output terminal N1 through the second switch S2. Accordingly, the power unit 160 may change the power voltage Vout output to the output terminal N1 by controlling a duty, meaning a duty cycle, for which the first switch S1 and the second switch S2 are turned off. The duty of the pulse signal for controlling the first switch S1 and the second switch S2 may be controlled by the power management circuit 170.

The power management circuit 170 controls the power voltage according to a line resistance of the power line PL connected to the data driver 130 and load level of a load.

Figure 5:
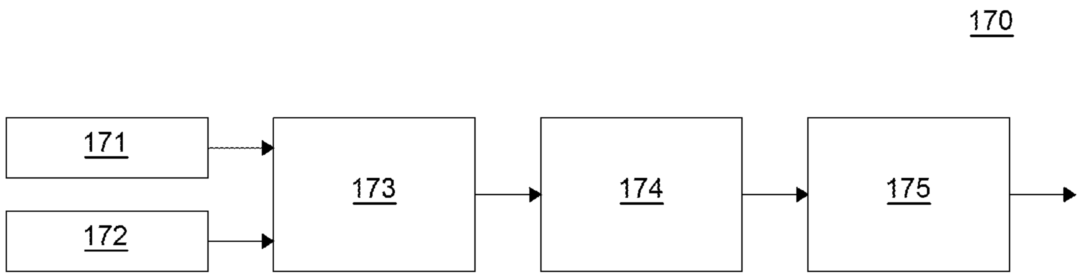
FIG. 5 is a block diagram illustrating a power management unit.

Referring to FIG. 5, the power management circuit 170 includes a line resistance input unit 171, a load level determination unit 172, an output voltage calculation unit 173, a comparison unit 174, and a duty changing unit 175, which can also be termed a duty cycle changing unit 175.

A line resistance is input to the line resistance input unit 171. A line resistance that is a resistance of the power line PL connecting the output terminal N1 of the power supply unit 150 and the input terminal N2 of the logic circuit of the data driver 130 may input to the line resistance input unit 171. In this case, the line resistance may be pre-stored in the line resistance input unit 171, and calculated through a difference between the power voltage Vout output from the output terminal N1 of the power supply unit 150 and the power voltage Vout input to the input terminal N2 of the logic circuit of the data driver 130. A resistance value output from the line resistance input unit 171 is input to the output voltage calculation unit 173.

The load level determination unit 172 determines a load level. The load level determination unit 172 may be connected to the output terminal N1 of the power supply unit 150 to determine a load level of a load applied to the logic circuit driven by the power voltage Vout. Specifically, the load level determination unit 172 may determine the load level through the pulse signal for operating the first switch S1 of the power unit 160. In particular, the load level determination unit 172 may determine the load level in different manners according to current modes of the power unit 160.

First, the load level determination unit 172 may determine that the load level is highest when the current mode of the power unit 160 is a continuous conduction mode (CCM). When the current mode of the power unit 160 is the continuous conduction mode (CCM), a constant pulse signal, as shown in CCM of FIG. 6, may be input to the gate electrode of the first switch S1 of the power unit 160. In this case, the load level determination unit 172 may determine the load level as a highest load level based on the constant pulse signal input to the power unit 160.

When the current mode of the power unit 160 is a discontinuous conduction mode (DCM), the load level determination unit 172 may determine that the load level is high as a signal time for turning on the first switch S1 of the power unit 160 increases. When the current mode of the power unit 160 is the discontinuous conduction mode (DCM), the load level determination unit 172 may detect a switch-on time, that is a time for which a high signal for turning on the first switch S1 among the pulse signals for operating the first switch S1 of the power unit 160 is maintained. For example, when a pulse signal, for example, as in the DCM of FIG. 6, is input to the gate electrode of the first switch S1 of the power unit 160, the load level determination unit 172 may detect a switch-on time of a first signal for turning on the first switch S1 in the pulse signal. In this case, the load level determination unit 172 may determine that the load level is high in proportion to the switch-on time. For example, the load level determination unit 172 may determine that the load level is high when the switch-on time is long, and may determine that the load level is low when the switch-on time is short. In this case, the load level determination unit 172 may pre-store the load level corresponding to each switch-on time in a look-up table.

When the current mode of the power unit 160 is a pulse skipping mode (PSM), the load level determination unit 172 may determine that the load level is high as the number of signals for turning on the first switch S1 of the power unit 160 increases. When the current mode of the power unit 160 is the pulse skipping mode (PSM), the load level determination unit 172 may detect the number of high signals for turning on the first switch S1 among the pulse signals for operating the first switch S1 of the power unit 160.

For example, when a pulse signal as shown in the PSM of FIG. 6 is input to the gate electrode of the first switch S1 of the power unit 160, the load level determination unit 172 may count the number of high signals for turning on the first switch S1 in the pulse signal for a predetermined period of time. In this case, the load level determination unit 172 may determine that the load level is high in proportion to the number of high signals for turning on the first switch S1. For example, the load level determination unit 172 may determine that the load level is high when the number of high signals for turning on the first switch S1 for a predetermined period of time is great, and may determine that the load level is low when the number of high signals for turning on the first switch S1 for a predetermined period of time is low. In this case, the load level determination unit 172 may pre-store load levels corresponding to the number of high signals for turning on the first switch S1 for a predetermined period of time in the look-up table.

The load level determined by the load level determination unit 172 is input to the output voltage calculation unit 173.

The output voltage calculation unit 173 may calculate an output voltage according to the line resistance and the load level. The output voltage calculation unit 173 may calculate the output voltage such that the output voltage increases as the resistance value of the line resistance input from the line resistance input unit 171 increases.

For example, the output voltage calculation unit 173 may output an output voltage signal by performing calculation such that a high output voltage is output when the resistance value of the line resistance input from the line resistance input unit 171 is high. In addition, the output voltage calculation unit 173 may output an output voltage signal by performing calculation such that a low output voltage is output when the resistance value of the line resistance input from the line resistance input unit 171 is low. However, when a resistance value pre-stored in the line resistance input unit 171 is output, since the resistance value is fixed, the output voltage calculation unit 173 may calculate an output voltage according to the load level and output an output voltage signal.

The output voltage calculation unit 173 may calculate the output voltage such that the output voltage increases as the load level output from the load level determination unit 172 increases. For example, the output voltage calculation unit 173 may output an output voltage signal by performing calculation such that a high output voltage is output when the load level input from the load level determination unit 172 is high, and may output an output voltage signal by performing calculation such that a low output voltage is output when the load level input from the load level determination unit 172 is low. The output voltage signal output from the output voltage calculation unit 173 is input to the comparison unit 174.

The comparison unit 174 outputs a result value according to a comparison result between the output voltage of the output voltage calculation unit 173 and a reference voltage. The comparison unit 174 may compare the output voltage calculated and outputted by the output voltage calculation unit 173 with a reference voltage, and output a result value according to a comparison result. For example, the comparison unit 174 may output a result value for increasing the output voltage when the output voltage calculated by the output voltage calculation unit 173 is greater than the reference voltage, and output a result value for decreasing the output voltage when the output voltage calculated by the output voltage calculation unit 173 is less than the reference voltage. The result value output from the comparison unit 174 is input to the duty changing unit 175.

The duty changing unit 175 changes a driving duty of the first switch S1 and the second switch S2 according to the result value of the comparison unit 174. The duty changing unit 175 may generate and output a pulse signal capable of varying the driving duty of the first switch S1 and the second switch S2 based on the result value of the comparison unit 174. According to the pulse signal output from the duty changing unit 175, the first switch S1 and the second switch S2 of the power unit 160 are driven, so that the output voltage can be changed and output.

Accordingly, referring to FIG. 7, when the current mode of the power unit 160 is the pulse skipping mode (PSM), the display device 100 according to an exemplary embodiment of the present disclosure may determine that the load is small. However, in the display device 100, the load level determination unit 172 may determine that the load level is high as the number of high signals for turning on the first switch S1 for a predetermined period of time increases. In the display device 100, the power unit 160 may output the output voltage Vout in response to a level of the output voltage calculated by the output voltage calculation unit 173 according to the load level.

When the current mode of the power unit 160 is a discontinuous current mode (DCM), the load level determination unit 172 may determine that the load level is high as the signal time for turning on the first switch S1 of the power unit 160 increases, and in response to the level of the output voltage calculated by the output voltage calculation unit 173 according to the load level, the power unit 160 may output the output voltage Vout. In addition, when the current mode of the power unit 160 is the continuous conduction mode (CCM), it can be determined that the load level is highest, and in response to the level of the output voltage calculated by the output voltage calculation unit 173 according to the load level, the power unit 160 may output the output voltage Vout.

FIG. 8 shows measurement of voltages of respective nodes according to a load size of the load. In FIG. 8, N1 is the output terminal N1 of the power supply unit 150, N2 is the input terminal N2 of the logic circuit of the data driver 130, and Load is a load size of the data driver 130.

Referring to FIG. 8, in the display device 100 according to an exemplary embodiment of the present disclosure, the output voltage output from the output terminal N1 of the power supply unit 150 varies according to the load size. When the load size increases, the output voltage output from the output terminal N1 of the power supply unit 150 also increases, but a constant level of power voltage is input to the input terminal N2 of the logic circuit of the data driver 130. When the load size decreases, the output voltage output from the output terminal N1 of the power supply unit 150 also decreases, but a constant level of power voltage is input to the input terminal N2 of the logic circuit of the data driver 130.

Accordingly, the display device 100 according to an exemplary embodiment of the present disclosure may supply an optimized voltage to the data driver by significantly changing the power voltage output from the power supply unit in consideration of a voltage drop when the load size of the data driver is great, while slightly changing the power voltage output from the power supply unit in consideration of a voltage drop when the load size of the data driver is small. Accordingly, an object of the present disclosure is to provide a display device allowing for a reduction in power consumption compared to a case of unnecessarily supplying a power voltage of high voltage level even when the load size of the data driver is small.

Meanwhile, the power voltage input to the data driver may be measured through a resistor and fed back to the power supply unit to thereby correct a power voltage output from the power supply unit. However, there is a limitation, in that a power voltage where a voltage drop occurs due to the power line connected between the data driver and the power supply unit has to be fed back, so a power voltage that does not match the load size may be supplied. In addition, when the voltage is corrected by measuring a current through a resistor connected to the output terminal of the power supply unit, there is a defect in which an additional voltage drop occurs due to an addition of a separate resistor.

Accordingly, the display device 100 according to an exemplary embodiment of the present disclosure may determine the load level of the load according to the current mode within the power supply unit and output the power voltage of the level according to the determined load level, thereby supplying a voltage that is more accurately customized for the load size.

In addition, since the display device 100 according to an exemplary embodiment of the present disclosure changes the power voltage output from the power supply unit according to the load size of the data driver and supplies the power voltage customized for the load size of the data driver, it is possible to prevent occurrence of driving failure due to an excessive voltage level in an overload band of the data driver.

The exemplary embodiments of the present disclosure can also be described as follows:

According to an aspect of the present disclosure, there is provided a display device. The display device includes a display panel configured to display an image; a driving unit including a data driver and a gate driver for driving the display panel; and a power supply unit configured to supply a power voltage for driving the driving unit using an input voltage; wherein the power supply unit controls the power voltage according to a load level of the driving unit.

The power supply unit may include a power unit configured to generate the power voltage using the input voltage supplied to an input unit thereof and output the generated power voltage to an output terminal; and a power management circuit configured to control the power voltage according to a line resistance of a power line connected to the driving unit and the load level.

The power unit may include a first switch connected between the input unit and the output terminal, an inductor connected between the first switch and the output terminal, and a second switch connected between the first switch and the inductor.

The power management circuit may include a line resistance input unit to which the line resistance is input, a load level determination unit configured to determine the load level, an output voltage calculation unit configured to calculate an output voltage according to the line resistance and the load level; a comparation unit configured to output a result value according to a comparison result between the output voltage and a reference voltage; and a duty cycle changing unit configured to change a driving duty cycle of the switch according to the result value.

The load level determination unit may determine that the load level is highest when the power unit is in a continuous conduction mode (CCM).

The load level determination unit may determine that the load level is high as a signal time for turning on the first switch of the power unit increases, when the power unit is in a discontinuous conduction mode (DCM).

The load level determination unit may determine that the load level is high as the number of signals for turning on the first switch of the power unit increases, when the power unit is in a pulse skipping mode (PSM).

The output voltage calculation unit may calculate such that the output voltage increases as a resistance value of the line resistance increases.

The output voltage calculation unit may calculate such that the output voltage increases as the load level increases.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light ofthe above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:

a display panel configured to display an image;

a driving unit including a data driver and a gate driver for driving the display panel; and a power supply unit configured to supply a power voltage for driving the driving unit using an input voltage, wherein the power supply unit controls the power voltage according to a load level of the driving unit, wherein the power supply unit includes:

a power unit configured to generate the power voltage using the input voltage supplied to an input unit thereof and output the generated power voltage to an output terminal; and a power management circuit configured to control the power voltage according to a line resistance of a power line connected to the driving unit and the load level, and wherein the power management circuit includes:

a line resistance input unit configured to receive the line resistance of the power line connected between an output terminal of the power supply unit and an input terminal of the driving unit, a load level determination unit configured to determine the load level according to a current mode of the power supply unit;

an output voltage calculation unit configured to calculate an output voltage according to the line resistance and the load level;

a comparation unit configured to output a result value according to a comparison result between the output voltage and a reference voltage; and a duty cycle changing unit configured to change a driving duty cycle of the first switch and the second switch according to the result value.

2. The display device of claim 1, wherein the power unit includes:

a first switch connected between the input unit and the output terminal;

an inductor connected between the first switch and the output terminal; and a second switch connected between the first switch and the inductor.

3. The display device of claim 1, wherein the load level determination unit determines that the load level is highest when the power unit is in a continuous conduction mode, i.e., CCM.

4. The display device of claim 1, wherein the load level determination unit determines that the load level is high as a signal time for turning on the first switch of the power unit increases, when the power unit is in a discontinuous conduction mode, i.e., DCM.

5. The display device of claim 1, wherein the load level determination unit determines that the load level is high as the number of signals for turning on the first switch of the power unit increases, when the power unit is in a pulse skipping mode, i.e., PSM.

6. The display device of claim 1, wherein the output voltage calculation unit calculates such that the output voltage increases as a resistance value of the line resistance increases.

7. The display device of claim 1, wherein the output voltage calculation unit calculates such that the output voltage increases as the load level increases.

* * * * *